(12) United States Patent
Brand et al.

(10) Patent No.: US 11,601,499 B2
(45) Date of Patent: Mar. 7, 2023

(54) DECENTRALISED DATA STORAGE METHOD AND MEDIUM WITHIN A NETWORK

(71) Applicant: Schreder S.A., Brussels (BE)

(72) Inventors: Daniel Brand, Wedemark (DE); Helmut Schröder, Wiesbaden (DE)

(73) Assignee: Schreder S.A., Brussels (BE)

( * ) Notice: Subject to any disclaimer, the term of this patent is extended or adjusted under 35 U.S.C. 154(b) by 827 days.

(21) Appl. No.: 16/480,542

(22) PCT Filed: Feb. 9, 2018

(86) PCT No.: PCT/EP2018/053262
§ 371 (c)(1),
(2) Date: Jul. 24, 2019

(87) PCT Pub. No.: WO2018/146244
PCT Pub. Date: Aug. 16, 2018

(65) Prior Publication Data
US 2019/0384533 A1 Dec. 19, 2019

(30) Foreign Application Priority Data
Feb. 10, 2017 (DE) .......................... 102017102712.2

(51) Int. Cl.
*G06F 3/06* (2006.01)
*H04L 67/1097* (2022.01)
(Continued)

(52) U.S. Cl.
CPC ........ *H04L 67/1097* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS

| 2007/0171050 A1 | 7/2007 | Westhoff et al. |
| 2015/0254463 A1 | 9/2015 | Ryhorchuk et al. |
| 2018/0188018 A1* | 7/2018 | Brown .................... G01B 11/14 |

FOREIGN PATENT DOCUMENTS

EP 2709428 A2 3/2014

OTHER PUBLICATIONS

PCT International Search Report and Written Opinion, PCT International Application No. PCT/EP2018/053262, dated Apr. 4, 2018, 10 pages.

* cited by examiner

*Primary Examiner* — Scott C Sun
(74) *Attorney, Agent, or Firm* — McDonnell Boehnen Hulbert & Berghoff LLP

(57) ABSTRACT

Example embodiments relate to decentralised data storage. One embodiment includes a method of storing data within an external light network. The external light network includes a plurality of decentralised EDP units. Each of the decentralised EDP units belongs to a light. Each EDP unit has a communication means. There is at least one sensor arrangement respectively assigned to at least one of the EDP units. The method includes arranging a first EDP unit recording data. The method also includes storing a data set that includes the data recorded by the sensor arrangement of the first EDP unit or that has been generated from these data, distributed over a number of the decentralised EDP units. Further, the method includes at least partially deleting the data set after the distribution of the data set on the first EDP unit.

20 Claims, 2 Drawing Sheets

(51) Int. Cl.
*G06F 21/60* (2013.01)
*H04W 12/02* (2009.01)
*H04W 12/03* (2021.01)

(52) U.S. Cl.
CPC .......... *G06F 3/0652* (2013.01); *G06F 3/0659* (2013.01); *G06F 21/602* (2013.01); *H04W 12/02* (2013.01); *H04W 12/03* (2021.01)

Figur 1
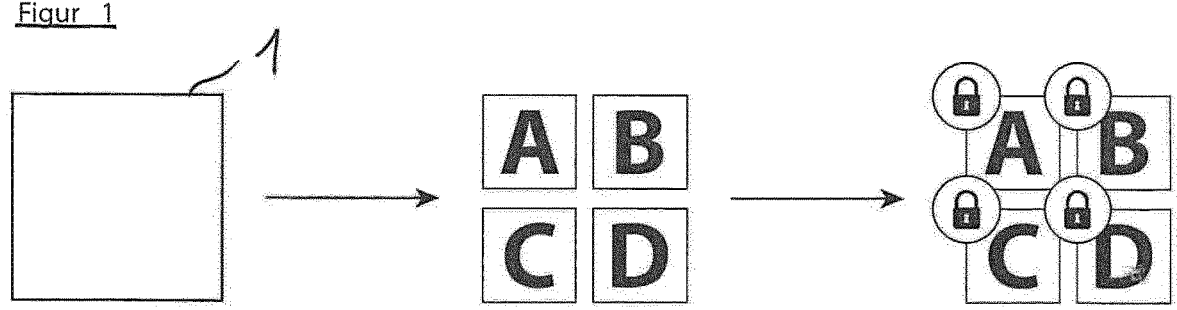
Figur 2
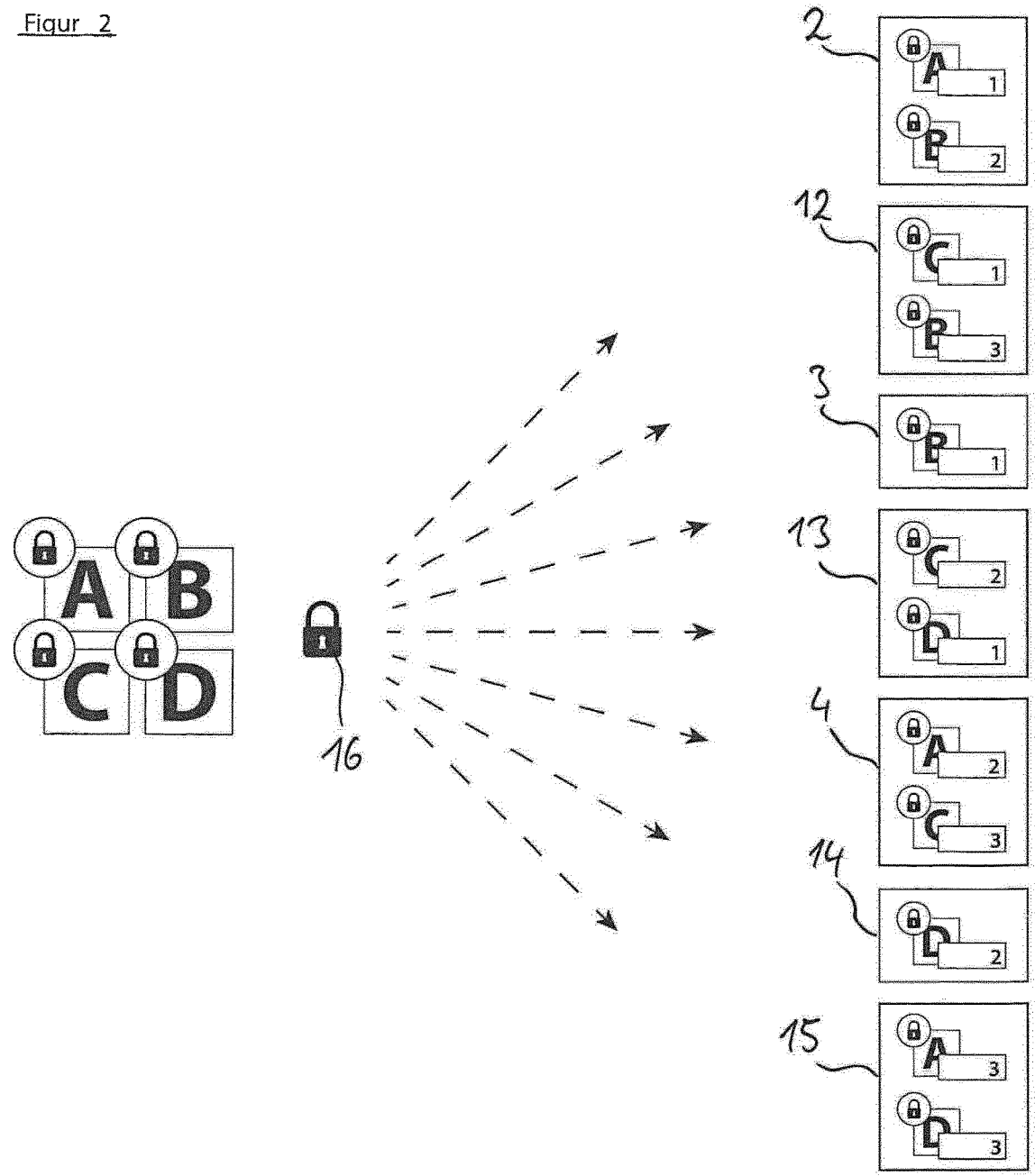

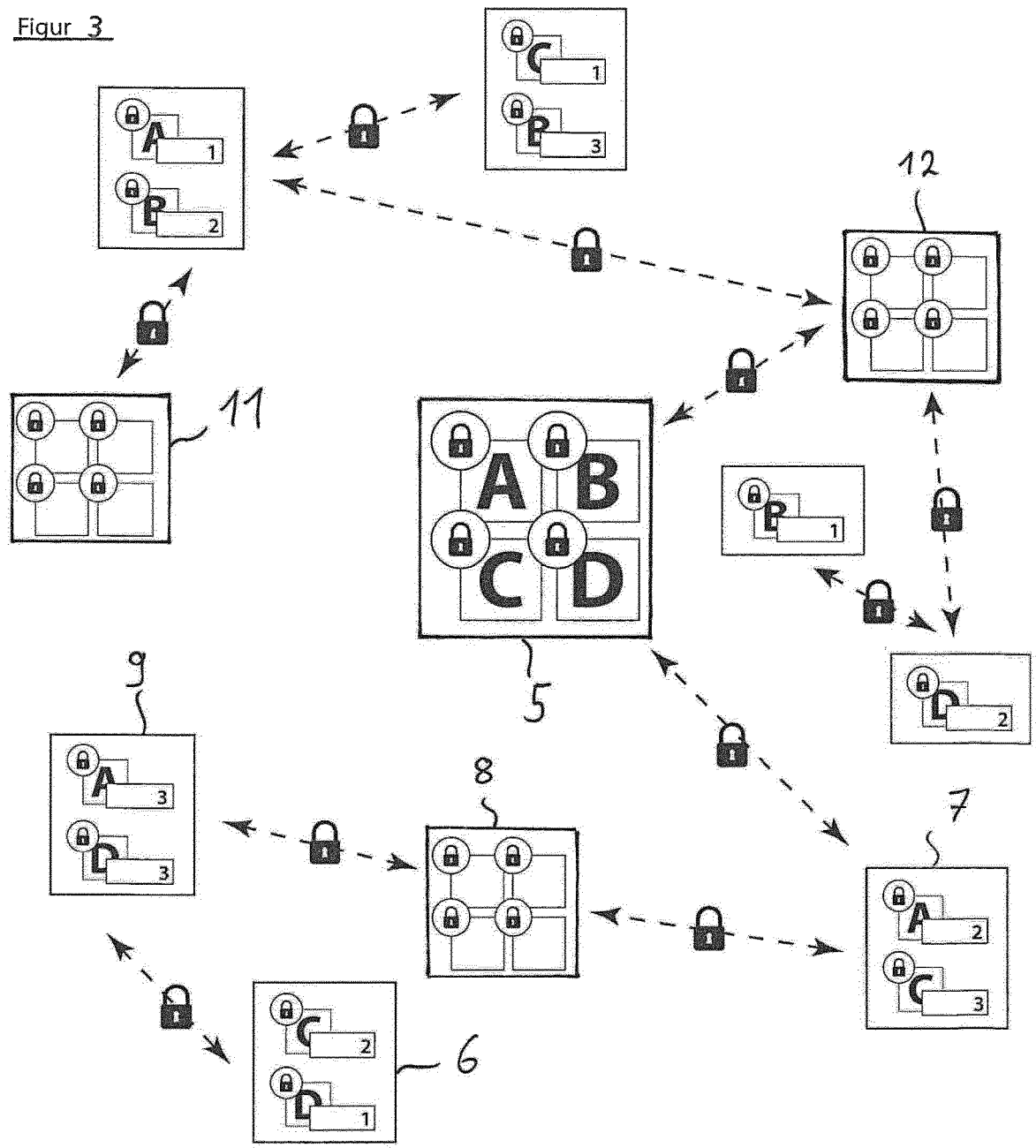
Figur 3

DECENTRALISED DATA STORAGE METHOD AND MEDIUM WITHIN A NETWORK

CROSS-REFERENCE TO RELATED APPLICATION

The present application is a national stage entry of PCT/EP2018/053262 filed Feb. 9, 2018, which claims priority to DE 10 2017 102 712.2 filed on Feb. 10, 2017, the contents of each of which are hereby incorporated by reference.

SUMMARY

The present invention relates to a method of storing data that is to be particularly protected within a network, in particular an external/outdoor light network, the network comprising a plurality of decentralised EDP units, e.g. each belonging to a light, in particular in the form of an external light, which units each have communication means, at least one sensor arrangement being respectively assigned to at least some of the EDP units. The method comprises the step of the sensor arrangement of a first EDP unit recording data. Therefore, the sensor arrangement works as a data source. The data are preferably data that are particularly worthy of protection, in particular security-relevant and/or personal data. Security-relevant data may be e.g. data on vehicle number plates. The data that are particularly worthy of protection include in particular personal data which include biometric data or from which biometric data can be obtained. Decentralised EDP units are EDP units which are arranged at different positions, and so spatially separated from one another, within a network, for example corresponding to the distance between street lights along a street.

Light networks, as used for example to illuminate streets or car parks, may be provided with sensors which are each assigned to an EDP unit. This comprises sensors which are connected wirelessly via radio or are integrated directly into the EDP unit by cable. For example, a lamp head of an external light may have a camera which monitors the illuminated area and is assigned to the EDP unit by cables, and so is part of this unit. Due to the communication means the EDP units are capable of communicating with one another directly or indirectly e.g. via a server or further EDP units. Preferably, all of the EDP units of a network can communicate with one another. However, it may also only be a sub-set, e.g. a network-specific subset, of the EDP units of a network that communicate with one another.

Furthermore, networks, for example, of lights for streets or paths are increasingly being equipped with sensors which can record operating data of the light as well as environmental data which are of interest to the operators or owners of the light networks. For example, traffic volume information may be recorded in order to control the light strength/intensity or temperature and other environmental data. Such data may temporarily be stored locally or on a central storage medium after the data are transferred. For example, the data may be conveyed from traffic cameras to a traffic control centre. According to the tasks which are increasingly assigned to a light, the latter have increasingly complex associated EDP units which are, for example, integrated into a lamphead and/or are placed on the latter.

When recording data which is particularly worthy of protection, in particular security-relevant and/or personal data, different legal framework conditions, e.g. within the framework of retained data storage, are to be taken into account in different countries. It is not always desirable or permitted here to convey the data generated continuously or in part by a data source to a central server because a high data transfer volume is associated with a plurality of data sources.

Moreover, the storage of directly usable personal data at the location of the data source and/or by means of the retained data storage may be legally problematic since specific security precautions often have to be taken for the storage of personal data at a location. The loss of the data source due to damage or misappropriation likewise leads to the loss of data with, under certain circumstances, legal consequences for the proprietor of the data source.

It is the object of the present invention to store the data recorded from a data source in a network that is especially in the form of a light network, and such that it can, nevertheless, not be used directly, and to avoid the problems described above.

According to an aspect of the invention there is provided a method of storing data preferably data that is particularly worthy of protection, e.g. security-relevant or personal data, within a network, the network comprising a plurality of decentralised EDP units each having communication means. At least some of the EDP units are provided with a sensor arrangement. The method comprises:
- a first EDP unit recording data,
- storing a data set which comprises the data recorded by the sensor arrangement of a first EDP unit or that has been generated from these data, distributed over a number of the decentralised EDP units; and
- at least partially deleting the data set after the distribution of the data set on the first EDP unit.

The storing of the data set in a distributed manner over the number of the decentralised EDP units may comprise partitioning the data set into data set parts or instances, and the sending of each data set part to a respective EDP unit of the number of EDP units, such that the data set parts are stored in different EDP units and such that none of the EDP units comprises the full data set. The partitioning is preferably such that one data set part does not allow the reconstruction of a meaningful part of the data set. For example, when the full data set is an image, a data set part may comprise a pixel data subset which is chosen such that no significant parts of the image can be reconstructed from the pixel data subset.

According to the invention provision is made such that a data set which comprises or contains data recorded by the sensor arrangement of a first EDP unit or that is generated from these data is distributed over a number of the decentralised EDP units and in particular is stored redundantly and after the distribution, and in particular subsequently to storage on the plurality of decentralised EDP units is at least partially deleted on this first EDP unit. Optionally, one or more parts, in particular non-connected parts of the data set, are also stored on the first EDP unit and are accordingly not deleted. The data set, the parts of which have optionally been copied and distributed, is not fully available on any of the EDP units of the network after deletion or until it is re-established.

With the method according to the invention it becomes possible to use a network that is to be assembled or that already exists to collect and store data which are particularly worthy of protection without the data being conveyed constantly to a central entity via e.g. GSM connections which are often expensive, and being available here to third parties without any restriction within the framework of retained data storage. The data which are particularly worthy of protection may therefore only be retrieved from the network when required by circumstances and are kept secure due the decentralised storage. Since the communication costs are generally lower on the local or regional (network) level, operating costs are also saved.

The data set may contain data of any type. These may be data of a sensor or of a number of sensors of a light. Sensors recording environmental data such as temperature, humidity, volume, fine dust and/or nitrogen oxide or sensors processing electromagnetic waves such as sensors generating 1D, 2D and/or 3D digitalised data, in particular optical sensors, for example, are used as the sensors of a sensor arrangement. These may also be sound sensors for recording acoustic signals, in particular of speech. The data may be e.g. number plate data or data on a person, possibly a recognised person, recorded in the area of the sensors of a sensor arrangement, or even motion sequences or film sequences over a specific time which are analysed by image processing software of the EDP unit. These may also be data acquired by tracking smartphone data, e.g. via Bluetooth, wifi or NFC beacons.

In particular, for security reasons the recorded data are only stored temporarily in the first EDP unit, in particular only until they have been processed into a data set. According to another embodiment, the recorded data may also be temporarily stored in the sensor arrangement itself outside of the EDP unit if the sensor unit is not integrated directly into the EDP unit, but are also deleted here at the latest after distributing the data set parts.

Likewise, the complete data set, which at least comprises the recorded data or may correspond to the recorded data, is only stored temporarily, and preferably, in the EDP unit.

For reasons relating to the EDP structure it may be advantageous if the data set is broken down into data set parts before distribution, and so the individual data set parts are successively separated. In particular, the data set parts are generated here, or also generally, by copying parts of the data set. According to the second alternative, the data set remains complete until it is deleted, and so after being broken down clearly more memory is required than in the first version in which the data set is already reduced in terms of storage capacity while being broken down. It goes without saying that the breakdown and distribution into the network can be interwoven with one another so that a data set part that has already been separated is already distributed (and optionally previously encrypted), while other data set parts are generated on the first EDP unit.

In a possible embodiment, when the first EDP unit sends a data set part to another EDP unit, the other EDP unit sends an acknowledgement to the first EDP unit to confirm safe receipt of the data set part, and the first EDP unit only deletes said data set part after having received the acknowledgement.

The EDP units provided with a sensor arrangement are preferably provided with image processing software which analyses the data recorded by a camera. The data sets obtained in this way may then in particular require less memory than the untreated, and in particular non-segmented data.

For example, the sensor arrangement comprises a motion detector and a camera so that upon detecting motion, the camera takes a picture or records an image sequence. In order to save memory, according to the invention it may additionally be specified at what minimum intervals of time successive images or image sequences are recorded.

The data set is either split up in the EDP unit directly after being recorded or a data set (of processed data) is initially generated from the recorded data, which data set is then broken down into data set parts. These data set parts are distributed in their entirety or at least predominantly to the other EDP units of the light network and are stored here. One or a few data set parts may optionally remain on the first EDP unit, as described. The division or breakdown of a data set preferably takes place such that no conclusions can be drawn regarding the content of the data set from a single data set part. There may, for example, be a breakdown into randomly selected data set parts made up of unconnected data areas for which an assignment instruction is additionally issued. Likewise, these may alternatively or additionally be encrypted parts of the data set. Preferably, the data set is split up, and the data set parts are then encrypted, preferably locally at the site where they are split up. Alternatively the data set may only be encrypted locally at the data generation site, and then be split up.

Depending on the type of division and storage, the data may be stored redundantly so that data security is implemented, e.g. similarly to a Raid 5 memory group. Alternatively, the data parts may also be reflected, similarly to a RAID 1 or RAID 2 group, i.e. stored such as to be distributed a number of times identically within the light network. A data set which may possibly be critical in terms of data protection law is therefore only temporarily fully retained in the EDP unit, e.g. a light, at the time of recording or directly afterwards. It is then distributed immediately, or optionally after a specifiable period of time such that, for example, no data set is totally destroyed by a failure of the EDP unit or in particular can be stolen by misappropriation of an EDP unit.

One or more instructions for the breakdown and distribution of the data, also referred to in the following as breakdown and distribution keys, may be stored at a central confidential location. This may be a specially set up server, for example of the network operator or of a trustworthy entity that can in particular be specifically determined (e.g. a trust centre). The breakdown and/or distribution keys may be specified and/or be generated automatically. Both the distribution key and the decryption key may also be broken down as protection against misuse and may be distributed to various entities.

By distributing the data a greater occurrence of data is generated locally, although communication is minimised from the local or regional network in the direction of the operating server of the network. If the data set must be made available, for example by official order or at the request of a trustworthy person or entity, the data set may either be put back together again on the EDP unit from which it was distributed, on any other EDP unit, or on a superordinate entity. For this purpose the respective parts may be conveyed to the entity that is to bring them together in accordance with the breakdown or distribution key.

In a possible embodiment, the EDP unit or other entity that is to put the data set parts back together sends requests to all EDP units requesting for the requested data set parts. To that end the data set parts may be provided with unique identifiers such as a time stamp and a location identifier. The EDP unit is configured to receive such requests and to check if any of the requested data set parts are stored within its memory, and to respond by sending the requested one or more data set parts to the requesting EDP unit or other entity.

Often the data set parts are transmitted wirelessly between e.g. individual lights and their EDP units. In order to avoid undesirable read-out of the data sets and/or parts of the latter, the data set or the data set parts may additionally be encrypted. Accordingly, the data set or also a data set part may be stored when it has already been distributed in encrypted form. In addition, the distribution may take place via encrypted communication.

Preferably, a key for encrypting the data set may be made available by a/the superordinate entity and/or may be generated automatically. The same then applies to the decryption instruction or to a key required for the decryption. The respective location confirming the authenticity or integrity of the respective keys may likewise once again be a trust centre or some other trustworthy entity. These may respectively also be used to store the keys.

Depending on the type of data set, according to a further development according to the invention the latter can be categorised in the EDP unit by means of predetermined algorithms or classifications. Thus, for example, personal data sets can be particularly secured and be encrypted with strong encryption such as currently e.g. SHA-256 or be transmitted in encrypted form. These data and data sets may preferably only be put together and be retrieved with a high, e.g. official authorisation level, while the light data such as current intensity, power consumption, temperatures etc. have an operator authorisation level that is generally lower. Advantageously, different security or authorisation levels can also be given for distributed storage of any data set parts and/or the decryption and distribution keys, and so in particular it is only made possible to bring together data set parts to form a data set obtained, for example, on the basis of face recognition, by approving a number of authorised users, e.g. a judicial user and an operator user.

Advantageously, the distribution and encryption of the data within the network therefore takes place dependently upon desired or predeterminable or predetermined security levels.

The superordinate entity may be realised, for example, on a project server, a management server or some other server or be formed by the latter, which servers may respectively be connected to the network via established protocols, for example via mobile radio, WLAN, LAN or other communication protocols. Users of different authorisation levels may then access this superordinate entity and retrieve data worthy of protection to different degrees dependently upon their authorisation levels. The distribution of the data within the network may preferably be moved via locally acting communication protocols, for example on ZigBee, 6LoW-PAN or IEEE 802.15.4 or Thread-Basis or in particular on TCP/IP-based standards. It goes without saying that the respective EDP unit itself either has corresponding communication interfaces for this purpose or has access to these. After the data set parts are brought together to form a data set, the respective data set parts can be deleted on the various EDP units.

According to another embodiment of the method according to the invention a maximum life span may be specified for individual data set parts. These can also be defined in advance for specific data sets and can be provided along with the data set parts when they are distributed. After this life span has expired the data set parts, and so the data set, are deleted, in particular without previously bringing them together, including any decryption of the data set parts. According to a further development of the invention the life span of the data set parts may be allocated dependently upon the memory that is available within the network for the data set parts.

Thus, in another further development according to the invention, upon adding EDP units without an associated sensor arrangement but with a memory unit, a larger memory for data that is worthy of protection can be produced. This is particularly advantageous for external light networks in which, for example, not every light along a street is equipped with a sensor, e.g. a camera, but moreover the lights have identical EDP units in the form of the respective controllers. An EDP unit is therefore formed in particular by a controller of the respective light, memories being made available in the controllers. The controllers typically comprise at least one microprocessor unit with an associated memory, means for communication preferably over near, middle and/or far distances (e.g. bluetooth, LAN, WLAN and/or GSM units) and means for operating the illuminant which is in particular in the form of an LED. The respective means may be integrated to different degrees with and in one another depending on the controller.

In order to utilise the memory available in light networks in the best possible way, according to another embodiment according to the invention the data set parts may preferably be deposited in a circulating memory. The latter may, for example, be constructed such that the oldest element is deleted from the memory upon reaching the memory limit or the predetermined life span of, for example, 31 days in order to be able to store a new data set part. By synchronising the memories of the individual EDP units, the data set parts of a data set which have the same age are respectively deleted.

If a data set is to be brought back together again, at least one key required to decrypt the data set or the data set parts may preferably be transmitted from a superordinate entity to the corresponding EDP unit or the respective data set parts are retrieved according to the distribution key from the respective EDP units and are decrypted on the superordinate entity. The same applies not only to decryption, but also for bringing together data set parts that are distributed incrementally or in some other way.

Preferably, the total data of the data sources, in particular the sensor arrangement, that are to be processed by an EDP unit, are processed on the first or also on another EDP unit to form a plurality of data sets. Thus, for example, different filter algorithms can be used in order to separate number plates, faces, vehicles or other features, for example, from an image and to be able to store them with e.g. different authorisations.

Alternatively and in addition, data recorded at least at another, later point in time can be used together with the previous data to produce the data set. In this way temporal changes, for example, in the volume of traffic can be imaged and stored. It is likewise possible to generate motion profiles from objects located within the framework of the network of the EDP units.

If a plurality of data sets is generated from recorded data, e.g. on the basis of different image analysis methods, these different data sets may advantageously be encrypted to different degrees or be distributed to different extents over the EDP units, the local network traffic being able to be optimised. Only data which are to be given particularly strong protection are then distributed widely with a large amount of network traffic and e.g. redundantly a number of times. For the decision regarding how which data sets are encrypted and optionally are also distributed, the data may be categorised as described above. Categorisation therefore takes place, for example, by using different filters in an image analysis and/or more generally by specifying which data sets or data are particularly worthy of protection.

The network is preferably a network in the form of a mesh network in which a plurality of lights are organised locally or regionally. This acts in particular on the basis of 6LoW-PAN or ZigBee or Thread. Alternatively, it may also be a more widely distributed, e.g. internet-based network which, in particular encrypted with one another, communicates e.g. via IEEE 801.15.4 or Powerline Communication.

Preferably, the EDP units therefore respectively comprise a controller for operating a light, the network communication being controlled via the controller. At the same time the data set can be issued and/or distributed via the same or another controller of the light. For the purpose of identifying the respective data set parts, the latter are preferably provided with a clear identifier (a UID) and/or a time stamp, this information being able to be stored centrally on a memory, for example a server. Automatic deletion can then also take place by means of the time stamp. For example, for each data set part a time stamp and a locations (e.g. a GPS location) may be added to the data thereof. In that way, when the superordinate entity may request the EDP units to send e.g. all data set parts containing data recorded at within a certain time period and within a certain region.

In order to reduce the data communication and the space required to store the data as far as possible, the data set parts are stored distributed in particular in compressed form.

Especially advantageous for traffic authorities and penal action is a sensor arrangement which has at least a 2D or 3D camera, the data of which are analysed in particular by image processing software of the EDP unit.

In particular with large data sets, in a further development according to the invention, the distribution of the data set can not only be undertaken by a first EDP unit, but at least also by another EDP unit or optionally another light. For this purpose the data set is first of all split up on the EDP unit that has the data source or sensor arrangement into, for example, two data set parts, the second of which is then transmitted to another EDP unit. From here this data set part is further split up or encrypted and distributed within the network, while the first EDP unit proceeds similarly with its remaining data set part. The data are thus deposited more quickly in the network, in particular distributed in encrypted form.

The object specified at the start is also achieved by a light for implementing a method described above or below, the light having an EDP unit with at least one communication means with additional EDP units and/or a superordinate entity, and in particular at least one controller for operating the light, the controller being designed to distribute a data set which contains data recorded by the sensor arrangement of a first EDP unit or which has been generated from these data, over a number of the other EDP units, and then to delete these at least partially on this first EDP unit. Accordingly, the light also comprises a sensor arrangement assigned to the light with at least one sensor for recording data. With this type of light a network referred to below can be constructed, which network likewise achieves the object specified at the start.

Thus, according to the invention a network of lights is provided, which has a plurality of lights described above or below.

According to a further aspect of the invention, there is provided a computer program comprising computer-executable instructions to perform the method, when the program is run on a computer, according to any one of the steps of any one of the embodiments disclosed above.

According to a further aspect of the invention, there is provided a computer device or other hardware device programmed to perform one or more steps of any one of the embodiments of the method disclosed above. According to another aspect there is provided a data storage device encoding a program in machine-readable and machine-executable form to perform one or more steps of any one of the embodiments of the method disclosed above.

According to a further aspect of the invention, there is provided a method of storing data preferably data that is particularly worthy of protection, e.g. security-relevant or personal data, within a network, the network comprising a plurality of decentralised EDP units each having communication means, wherein the method comprises the steps of:
  storing a data set distributed over a number of the decentralised EDP units; and
  at least partially deleting the data set after the distribution of the data set on the first EDP unit.

More in particular, the principles set out above may be applied in other networks of "things" where data that is particularly worthy of protection has to be stored. The preferred features set out above for networks with sensor arrangement also apply for other similar networks where sensitive data is to be stored.

The full data set may be stored only temporarily in the first EDP unit.

The data set may be broken down into data set parts before or during distribution.

The data set parts may be generated by copying parts of the data set.

The data set parts may be stored distributed in encrypted form.

After distribution, the data set may be brought back together on an EDP unit, in particular the first EDP unit, or on the superordinate entity upon a request of a superordinate entity.

The network may be in the form of a mesh network.

Each part of the data set may be provided with a UID and/or a time stamp and/or a location indication.

The data set may be compressed prior to distribution.

According to another aspect there is provided an EDP unit with at least one controller and means for communicating with other EDP units and/or a superordinate entity, wherein the controller is designed to distribute a data set over a number of the other EDP units, and then to delete the data set at least partially on this the first EDP unit.

BRIEF DESCRIPTION OF THE DRAWINGS

Further advantages and details of the invention can be gathered from the following description. The illustrations show as follows:
  FIG. 1 part of the method according to the invention,
  FIG. 2 another part of the method according to the invention,
  FIG. 3 part of another method according to the invention.

Individual technical features of the exemplary embodiments described below may also be combined with previously described exemplary embodiments and the features of the independent claims and any other claims to form objects according to the invention. If sensible, elements which have the same functional effect are provided with identical reference numbers.

DETAILED DESCRIPTION

According to the invention provision is made such that after being produced, a data set 1 shown above as a rectangle is split up, for example into four parts A, B, C, D on the basis of data of a sensor arrangement (FIG. 1). After successfully being split up, the data set 1 may already be deleted so that it is only temporarily stored in the EDP unit. The data set itself may be formed by the data originally generated by the sensor arrangement, for example by a 2D or 3D image of a camera. This can also be a data set generated by these data, for example by filtering specific parts of a 2D or 3D image so that A, B, C and D e.g. in their entirety produce a biometric data set or a car registration number.

The four data blocks A, B, C, D do not have to be split up incrementally. In fact, a breakdown instruction can be aimed at not creating connected data set parts so that an individual data set part A, B, C or D does not allow any inference of in particular larger connected areas of the original data set 1 from which the desired information can already be produced.

In a subsequent step the data set parts are encrypted on the EDP unit, illustrated by the closed U-locks on the individual data set parts A, B, C, D in FIG. 1 or FIG. 2.

Next the distribution of the encrypted data set parts according to FIG. 2 takes place on a number of the decentralised EDP units 2, 12, 3, 13, 4, 14 and 15 present in the network. Data sets A, B, C an D are distributed redundantly here, i.e. they are present a number of times so that the failure of one of the EDP units 2, 12, 3, 13, 4, 14 and 15 does not lead to a loss of the data set 1 such that the latter can not be fully put back together again. The data set parts are distributed by encrypted communication, indicated by the arrows passing from the U-lock 16. Distribution does not have to take place uniformly, there may be EDP units in the network without data set parts A, B, C, D or EDP units with a smaller number of data set parts than other EDP units. In this way one can allow, for example, for non-uniform configuration of the EDP units as regards memory and processor provision.

Since the data may optionally be compressed, the memory requirement is optimised. The compression may take place prior to encryption.

The network is in particular a mesh network of external lights which are each equipped with an EDP unit (FIG. 3). This is formed by the controller of the respective light which is either integrated, for example, into the lamp head or may also be placed on the lamp head housing. Not all of the lights or EDP units have to be provided with a sensor arrangement. The distribution of the data sets A, B, C, D in the network section shown in FIG. 3 with a total of eleven EDP units takes place such that not all of the EDP units are provided with the data set to be distributed.

The connections of the individual EDP units shown by dashed double arrows are all encrypted. For example, the distribution of the encrypted data set parts A, B, C, D originating from an EDP unit 5 provided with a sensor unit to another decentralised EDP unit 6 takes place via encrypted connections between the additional EDP units 7, 8 and 9. EDP units 8, 11 and 12 do not have any data set parts. During and/or after distribution the EDP unit 5 preferably waits for the input of confirmation of receipt or storage ("acknowledge") from the respective EDP units and then deletes preferably predominantly data set parts A, B, C and D. For re-establishment communication preferably takes place back along the arrows if the data set is to be re-established on the EDP unit 5.

The distribution of the redundant data set parts of data sets A, B, C, D preferably takes place according to the rules of a mesh network which is set up on the basis of ZigBee. By combining redundant storage of the data with a ZigBee network or mesh network which is also capable of self-organisation, maximum failure protection of the light network or a high degree of data protection is possible without these being brought together centrally. This is particularly advantageous for external light networks which must be operated in a fail-proof manner due to often extensive distribution and difficult positioning of the lights.

The invention claimed is:

1. A method of storing data within a network,
wherein the network comprises a plurality of decentralised electronic data processing (EDP) units,
wherein the method comprises:
arranging a first EDP unit recording data, wherein the first EDP unit has a communication means, and wherein there is at least one sensor arrangement assigned to the first EDP unit;
storing a data set that comprises the data recorded by the sensor arrangement of the first EDP unit or that has been generated from these data, distributed over a number of the decentralised EDP units, wherein each EDP unit has a communication means, and wherein there is at least one sensor arrangement respectively assigned to at least one of the EDP units; and
at least partially deleting the data set after the distribution of the data set on the first EDP unit.

2. The method according to claim 1, wherein the recorded data are stored in the first EDP unit before being at least partially deleted after the distribution of the data set on the first EDP unit.

3. The method according to claim 1, wherein the complete data set is stored before being at least partially deleted after the distribution of the data set on the first EDP unit.

4. The method according to claim 1, wherein the data set is broken down into data set parts before or during distribution.

5. The method according to claim 1, wherein the data set parts are generated by copying parts of the data set.

6. The method according to claim 1, wherein the data set is stored distributed in encrypted form.

7. The method according to claim 1, wherein, after distribution, the data set is brought together on the first EDP unit or on a superordinate entity upon a request of a superordinate entity.

8. The method according to claim 7, wherein at least one key required for a decryption is transmitted from the superordinate entity to the first EDP unit.

9. The method according to claim 6, characterised in that a key for encrypting the data set is made available by a superordinate entity or is generated automatically.

10. The method according to claim 1, wherein data of the sensor arrangement recorded at one point in time are processed on the first EDP unit or another EDP unit to form a plurality of data sets.

11. The method according to claim 10, wherein the data sets of the plurality of data sets are stored distributed over the EDP units respectively encrypted to different degrees based on a categorisation.

12. The method according to claim 1, wherein data recorded at at least another, later time are used with the previous data to produce the data set.

13. The method according to claim 1, wherein the network is a mesh network.

14. The method according to claim 1, wherein the first EDP unit belongs to a light, wherein the EDP units respectively comprise a controller for operating the light, and wherein the network communication takes place using the controller.

15. The method according to claim 14, wherein the data set is issued or distributed via the same or another controller of the light.

16. The method according to claim 1, wherein each part of the data set is provided with a UID or a time stamp.

17. The method according to claim 1, wherein the data set is compressed prior to distribution, or wherein the sensor arrangement has a 2D camera or a 3D camera, the data of which are analysed in particular by image processing software of the first EDP unit.

18. The method according to claim 1, wherein the distribution of the data set is undertaken by the first EDP unit and at least another EDP unit.

19. A light for implementing a method according to claim 1, the light comprising:
- a first EDP unit with at least one controller for operating the light and means for communicating with other EDP units or a superordinate entity; and
- a sensor arrangement assigned to the light,
- wherein the controller is designed to distribute a data set that contains data recorded by the sensor arrangement of the first EDP unit or that has been generated from these data, over a number of the other EDP units, and then to delete the data set at least partially on the first EDP unit.

20. A digital data storage medium encoding a machine-executable program of instructions to perform a method of storing data within a network, wherein the network comprises a plurality of decentralised electronic data processing (EDP) units, wherein the method comprises:
- arranging a first EDP unit recording data, wherein the first EDP unit has a communication means, and wherein there is at least one sensor arrangement assigned to the first EDP unit;
- storing a data set that comprises the data recorded by the sensor arrangement of the first EDP unit or that has been generated from these data, distributed over a number of the decentralised EDP units, wherein each EDP unit has a communication means, and wherein there is at least one sensor arrangement respectively assigned to at least one of the EDP units; and
- at least partially deleting the data set after the distribution of the data set on the first EDP unit.

\* \* \* \* \*